(12) United States Patent
Berto

(10) Patent No.: US 6,839,493 B2
(45) Date of Patent: Jan. 4, 2005

(54) OPTICAL CONNECTOR MOUNT WITH SIX DEGREES OF FREEDOM

(75) Inventor: Thomas E. Berto, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/417,717

(22) Filed: Apr. 17, 2003

(65) Prior Publication Data

US 2004/0213521 A1 Oct. 28, 2004

(51) Int. Cl.[7] .............................. G02B 6/26; G02B 6/38; G02B 6/00
(52) U.S. Cl. .............................. 385/52; 385/66; 385/70; 385/72; 385/78; 385/84; 385/88; 385/90; 385/91; 385/93; 385/136; 385/137
(58) Field of Search .............................. 385/52, 66, 70, 385/72, 78, 84, 88, 90, 91, 93, 136, 137; 359/619

(56) References Cited

U.S. PATENT DOCUMENTS 5,973,842 A * 10/1999 Spangenberg ................ 359/619
6,577,793 B2 * 6/2003 Vaganov ....................... 385/52

* cited by examiner

Primary Examiner—John R. Lee
Assistant Examiner—Mary El-Shammaa

(57) ABSTRACT

A tube and a pair of optical frames are employed within an optical connector mount to optically couple two or more optical elements. The optical frames are used to mount the optical elements on the optical connector mount, and the tube is adjoined to the optical frames to allow and maintain the optical alignment of the optical elements. The adjoining of a tube to one of the optical frames involves either a seating and locking of a spherical segment of the tube within a tube seat of the optical frame, or a seating and locking of a spherical segment of the optical frame within a frame seat of the tube.

9 Claims, 8 Drawing Sheets

OPTICAL CONNECTOR MOUNT WITH SIX DEGREES OF FREEDOM

FIELD OF THE INVENTION

The present invention generally relates to optical assemblies. More specifically, the present invention relates to an adjustable optical connector mount for optically coupling two or more optical elements.

DESCRIPTION OF THE RELATED ART

Optical connector mounts known in the art employ two optical frames for optically coupling one or more optical elements supported by the frames. One drawback of some of the known optical connector mounts is an inability to allow six degrees of freedom during an operational alignment of the optical coupling of the optical elements. For those known optical connector mounts having six degrees of freedom during an operational alignment of the optical coupling of the optical elements, additional drawbacks can include (1) an insignificant travel in one or more of the six adjustments to the optical alignment of the optical coupling, (2) a slow and inaccurate locking of one or more of the six adjustments, (3) an inability to unlock one or more of the six adjustments, (4) high fabrication cost, and (5) lack of physical stability of the optical connector mount within various operating ranges of environmental conditions such as humidity and temperature. Therefore, there is a need for an optical connector mount with six degrees of freedom that eliminates most, if not all, of the aforementioned drawbacks of the known optical connector mounts.

SUMMARY OF THE INVENTION

The present invention advances the art by contributing an optical connector mount having six degrees of freedom constructed in accordance with an embodiment of the present invention. The optical connector mount includes a pair of frames and a tube for optically coupling a pair of optical elements (e.g., one or more optical fibers, one or more lens, one or more mirrors, one or more of any other type of optical element, and any combination thereof). To this end, each frame is for mounting one of the optical elements on the optical connector mount. The tube is adjoined to both frames to allow and maintain an optical alignment of the optical elements. One form for adjoining the tube to one of the frames is a seating and locking of a spherical segment of the tube within a tube seat of the frame. A second form for adjoining the tube to one of the frames is a seating and locking of a spherical segment of the frame within a frame seat of the tube.

Various forms, features and advantages of the present invention will become further apparent from the following detailed description of the presently preferred embodiments, read in conjunction with the accompanying drawings. The detailed description and drawings are merely illustrative of the present invention rather than limiting the scope of the present invention being defined by the appended claims and equivalents thereof.

DETAILED DESCRIPTION OF THE EMBODIMENTS

Figure 1:
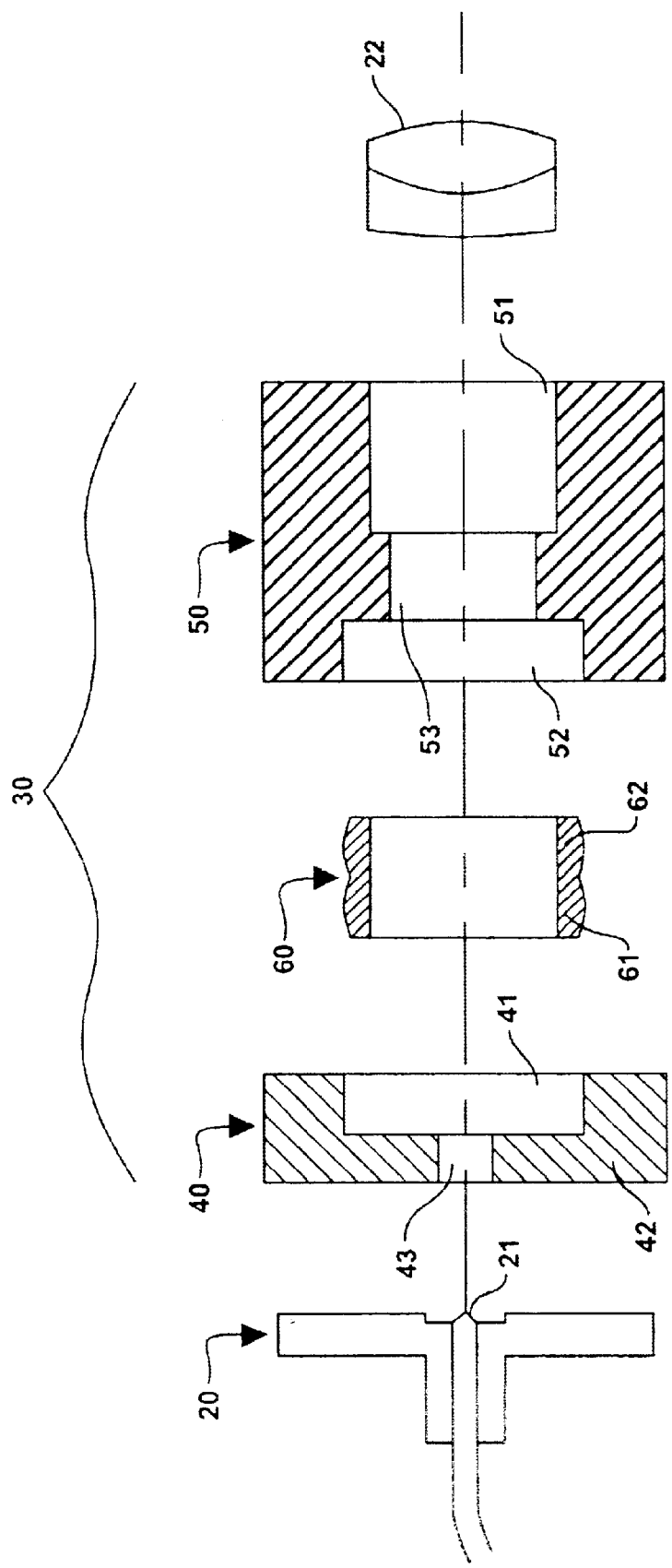
FIG. 1 illustrates a cross-sectional side view of a first embodiment of an unassembled optical connector mount constructed in accordance with the present invention.

FIG. 1 illustrates an optical frame 40, an optical frame 50, and a tube 60, which are the primary components of an optical connector mount 30 for optically coupling an optical fiber 21 and a lens 22 in accordance with one embodiment of the present invention. Optical frame 40 includes a tube seat 41 and a connector mount 42, and an optical passage 43 extending from connector mount 42 to tube seat 41. Optical frame 50 includes an optical seat 51, a tube seat 52, and an optical passage 53 extending from optical seat 51 to tube seat 52. The tube 60 includes a spherical segment 61 and a spherical segment 62.

Optical frame 40 provides a mounting of optical fiber 21 on optical connector mount 30 by a conventional affixing of an optical connector 20 to optical mount 42 via adhesives or screws. The optical frame 50 provides a mounting of lens 22 to optical connector mount 30 by a conventional seating of lens 22 within optical seat 51. An adjoining of tube 60 to optical frame 40 and optical frame 50 allows and maintains an optical alignment of optical fiber 21 and lens 22 as exemplarily represented by the dashed line extending between optical fiber 21 and lens 22. Tube 60 is adjoined to optical frame 40 by a seating of spherical segment 61 within tube seat 41, and tube 60 is adjoined to optical frame 50 by a seating of spherical segment 62 within tube seat 52.

Tube seat 41 and spherical segment 61 are dimensioned for freely seating spherical segment 61 within tube seat 41 (i.e., both an axial clearance and a radial clearance exist between tube seat 41 and spherical segment 61). Likewise, tube seat 52 and spherical segment 62 are dimensioned for freely seating spherical segment 62 within tube seat 52 (i.e., both an axial clearance and a radial clearance exist between tube seat 52 and spherical segment 62). Spherical segment 61 and spherical segment 62 are further dimensioned to allow for a spatial clearance between optical frame 40 and optical frame 50 when tube 60 is adjoined to optical frame 40 and optical frame 50.

Ideally, there would be zero radial clearance between tube seat 41 and spherical segment 61, and tube seat 52 and spherical segment 62. In practice, those skilled in the art will appreciate the actual radial clearance between tube seat 41 and spherical segment 61, and tube seat 52 and spherical segment 62 can depend upon many factors, particularly a manufacturing tolerance associated with a fabrication of optical frame 40, optical frame 50, and tube 60. In one embodiment, for spherical segments 61 and 62 with spherical radius of 10 millimeters, the radial clearance between seats 41 and 52 and spherical segments 61 and 62, respectively, is 15+/−7 microns.

The axial clearance between frame 40 and tube 60, and frame 50 and tube 60 is determined by considering the amount of movement expected in each of the six degrees of freedom during the alignment process.

Figure 2:
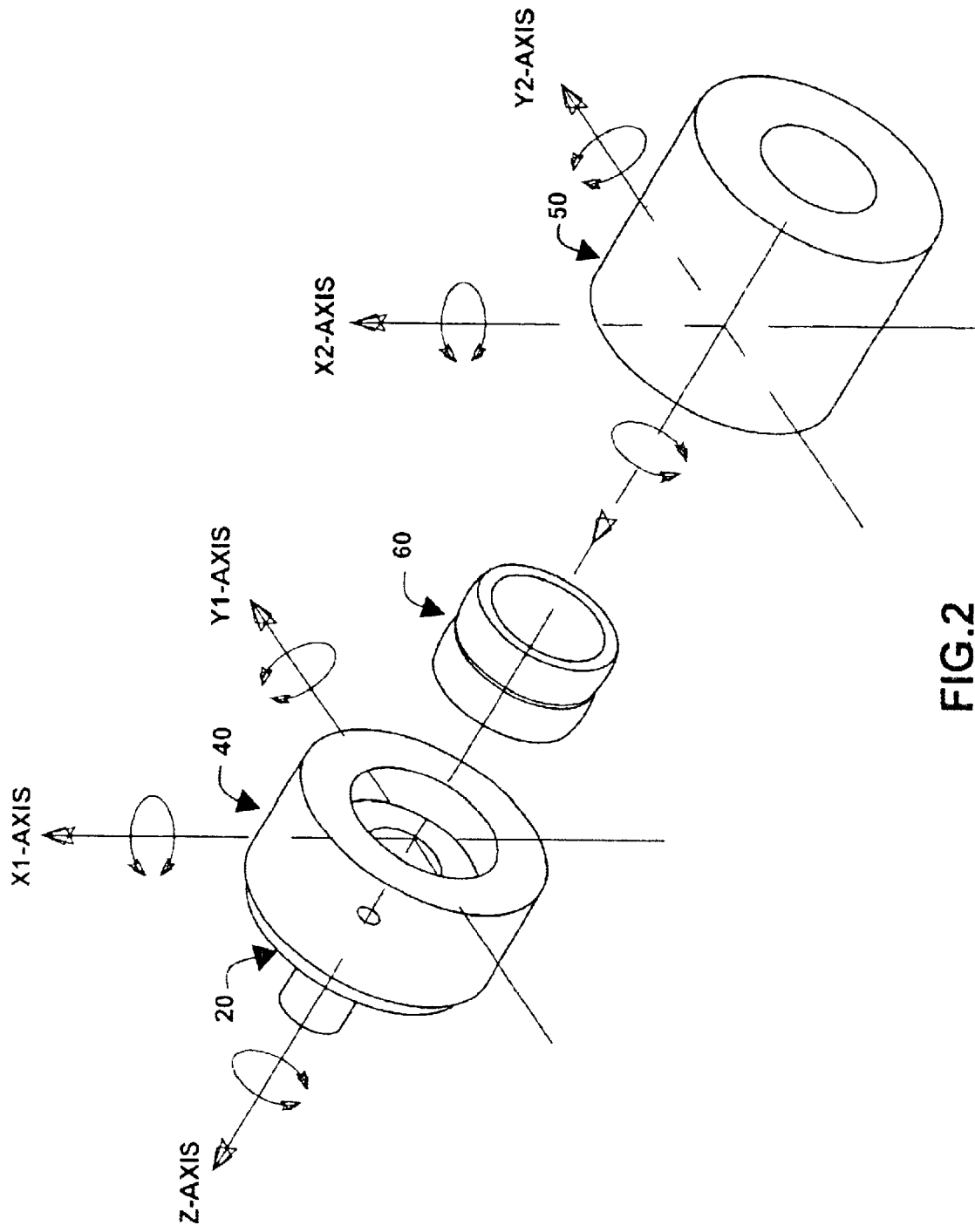
FIG. 2 illustrates a perspective of six degrees of freedom of various components of the optical connector mount illustrated in FIG. 1.

FIG. 2 illustrates the six degrees of freedom for optical frame 40 relative to lens 22, and optical frame 50 relative to optical fiber 21. As illustrated in FIG. 2, an X1-axis and a Y1-axis represent a pair of axes perpendicular to the Z-axis and intersecting optical frame 40. An X2-axis and a Y2-axis represent a pair of axes perpendicular to the Z-axis and intersecting optical frame 50. A Z-axis represents the optical axis of lens 22.

When spherical segment 61 is seated within tube seat 41 and spherical segment 62 is seated within tube seat 52, the six degrees of freedom of optical frame 40 are translations of optical frame 40 along the X1-axis, the Y1-axis and the Z-axis, and rotations of optical frame 40 about the X1-axis, the Y1-axis and the Z-axis as represented by the corresponding dashed curved arrows. Similarly, if frame 40 is held fixed, the six degrees of freedom of optical frame 50 are translations of optical frame 50 along the X2-axis, the Y2-axis and the Z-axis, and rotations of optical frame 50 about the X2-axis, the Y2-axis and the Z-axis as represented by the corresponding dashed curved arrows.

Referring to FIGS. 1 and 2, further adjustments to an optical alignment of optical fiber 21 and lens 22 can be accomplished in conventional manners. For example, the affixation of optical connector 20 to optical frame 40 can involve a translational movement of optical connector 20 along the X1-axis and/or the Y1-axis, and/or a rotation of optical fiber 21 about the Z-axis. Also by example, the seating of lens 22 within optical seat 51 can involve a translational movement of lens 22 along the Z-axis and/or a rotation of lens 22 about the Z-axis.

Referring again to FIG. 1, one method of assembling optical connector mount 30 in accordance with the invention includes a first stage involving a conventional affixing of fiber connector 20 to connector mount 41 and a conventional seating of lens 22 in optical seat 51. A second stage involves a seating of spherical segment 61 within tube seat 41, and a seating of spherical segment 62 within tube seat 52. The second stage utilizes the seating of segments 61 and 62 within tube seats 41 and 52, respectively, to allow for an optical alignment of optical fiber 21 and lens 22 during a third stage.

The third stage involves a stabilization of optical frame 50 and an adjustment of optical frame 40 relative to lens 22 via conventional tools, during which spherical segments 61 and 62 remain seated within tube seats 41 and 52, respectively. Optical frame 40 is adjusted to obtain a desired operational alignment of optical fiber 21 and lens 22 (e.g., an alignment where a focus point of the lens 22 coincides with the tip of optical fiber 21).

In one alternative embodiment, the third stage involves a stabilization of optical frame 40 and an adjustment of optical frame 50 relative to optical fiber 21 via conventional tools, during which spherical segments 61 and 62 remain seated within tube seats 41 and 52, respectively. Optical frame 50 is adjusted to obtain a desired operational alignment of optical fiber 21 and lens 22.

In a second alternative embodiment, the third stage involves both an adjustment of optical frame 40 relative to lens 22 and an adjustment of optical frame 50 relative to optical fiber 21 via conventional tools, during which spherical segments 61 and 62 remain seated within tube seats 41 and 52, respectively. Optical frames 40 and 50 are adjusted to obtain a desired operational alignment of optical fiber 21 and lens 22.

A final stage involves a locking of spherical segment 61 to tube seat 41 (e.g., by a screw or an adhesive), and a locking of spherical segment 62 to tube seat 52 (e.g., by a screw or an adhesive). The final stage uses the locking of spherical segments 61 and 62 to tube seats 41 and 52, respectively, to maintain the optical alignment of optical fiber 21 and lens 22 achieved during the third stage.

Various examples of assembling optical frame 40, tube 60 and optical frame 50 will now be described herein with reference to FIG. 1.

Figure 3:
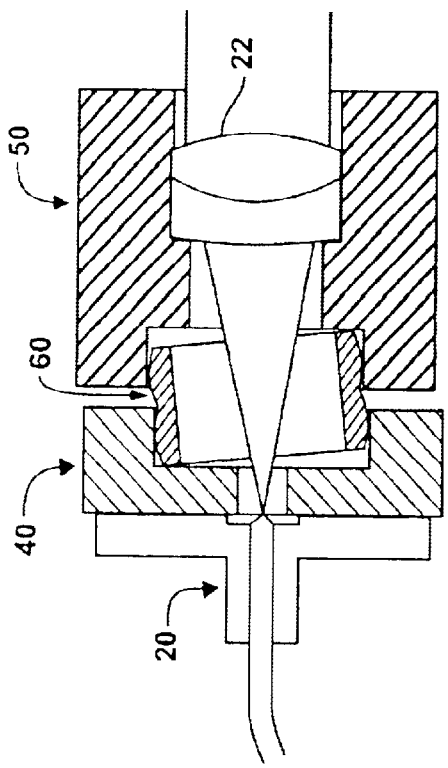
FIGS. 3–5 illustrate various exemplary assemblies of the optical connector mount illustrated in FIG. 1.

FIG. 3 illustrates a first exemplary assembly of spherical segments 61 and 62 of FIG. 1 to tube seats 41 and 52 of FIG. 1, respectively. In the FIG. 3 illustration, optical fame 40 is centered along the optical axis of lens 22 to align a focal point of lens 22 with the tip of optical fiber 21.

Figure 4:
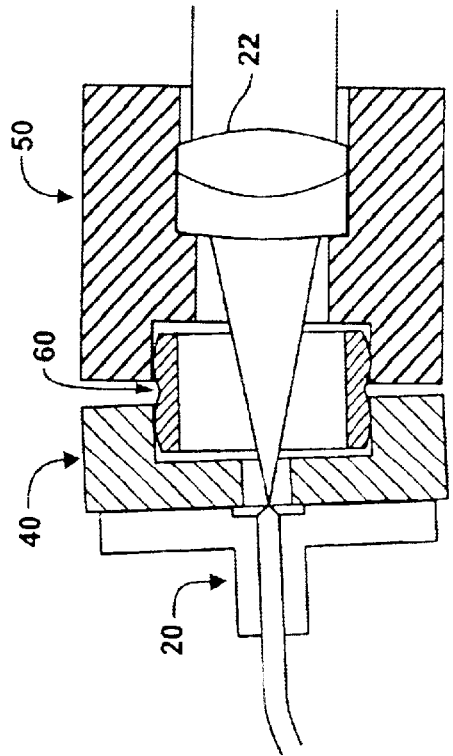

FIG. 4 illustrates a second exemplary assembly of spherical segments 61 and 62 of FIG. 1 to tube seats 41 and 52 of FIG. 1, respectively. In the FIG. 4 illustration, optical frame 40 is laterally offset relative to frame 50 to align the focal point of lens 22 with the tip of optical fiber 21.

Figure 5:
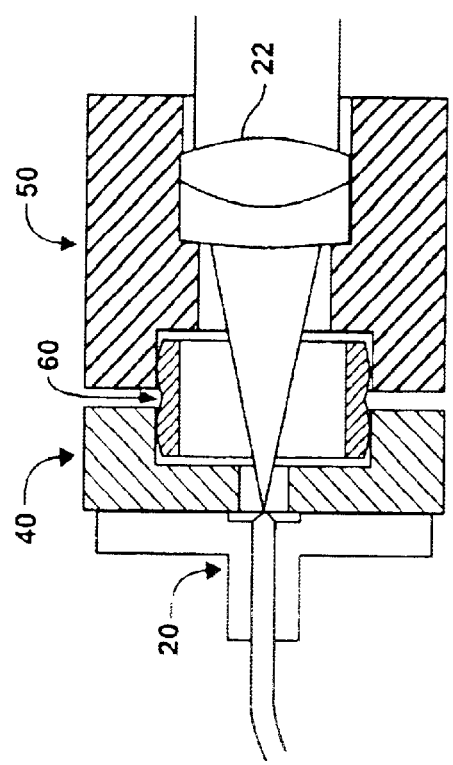

FIG. 5 illustrates a third exemplary assembly of spherical segments 61 and 62 of FIG. 1 to tube seats 41 and 52 of FIG. 1, respectively. In the FIG. 5 illustration, optical frame 40 is tilted relative to frame 50 to align the focal point of lens 22 with the tip of optical fiber 21.

From FIGS. 3–5, those having ordinary skill in the art will appreciate the ability to simultaneously axially offset, laterally offset, tilt, and rotate optical frame 40 relative to frame 50 when aligning the focal point of the lens 22 with the tip of optical fiber 21. Additionally, those having ordinary skill in the art will appreciate the ability to simultaneously axially offset, laterally offset, tilt, and rotate optical frame 50 relative to frame 40 when optically aligning the focal point of lens 22 with the tip of the optical fiber 21, yet retaining the ability to lock spherical segments 61 and 62 within tube seats 41 and 52, respectively, upon achieving alignment Referring still to FIGS. 3–5, the focal point of lens 22 coinciding with the tip of optical fiber 21 represents an ideal operational alignment of the optical coupling of optical fiber 21 and lens 22 in most applications of optical connector mount 30. However, in practice, the focal point of lens 22 does not have to coincide with the tip of optical fiber 21.

Figure 6:
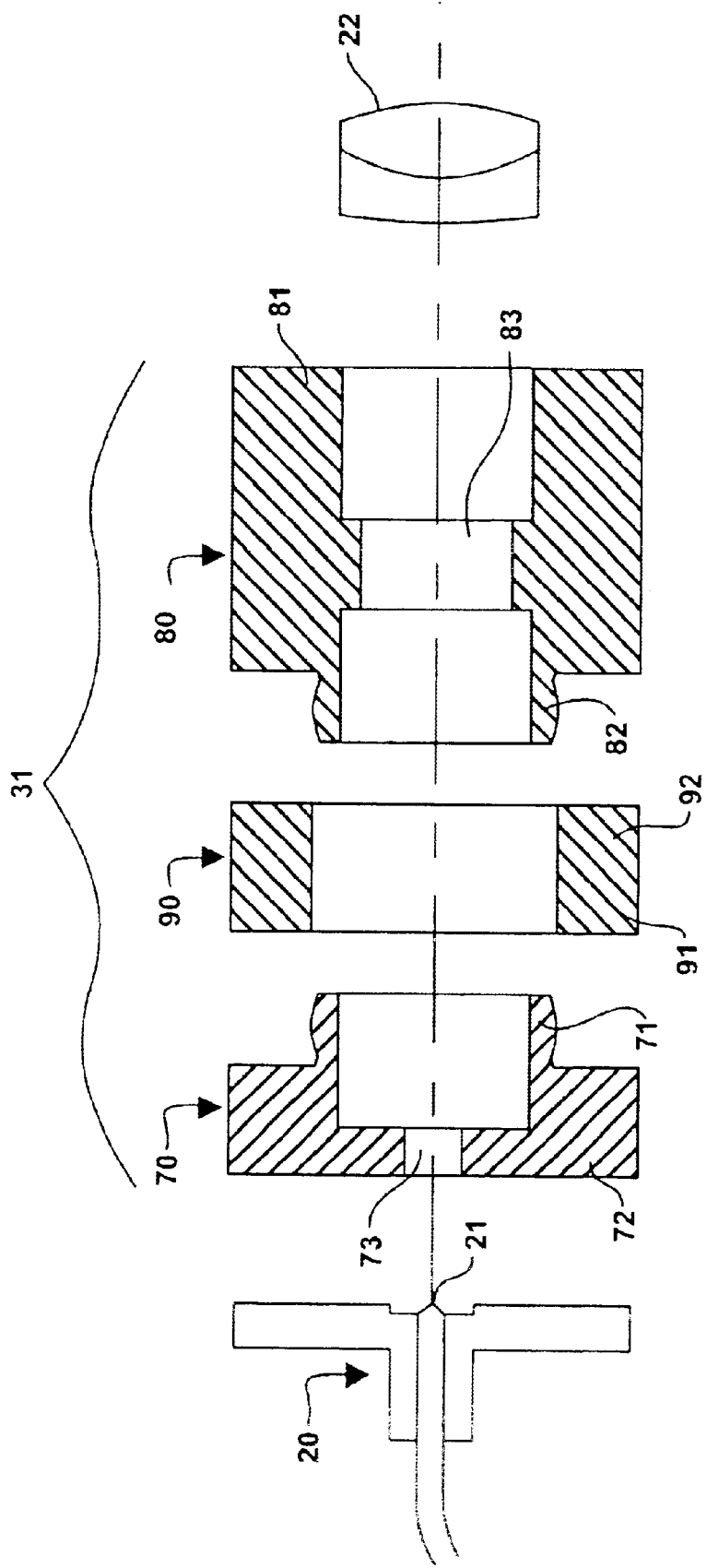
FIG. 6 illustrates a cross-sectional side view of a second embodiment of an unassembled optical connector mount constructed in accordance with the present invention.

FIG. 6 illustrates an optical frame 70, an optical frame 80, and a tube 90, which are the primary components of an optical connector mount 31 for optically coupling optical fiber 21 and lens 22 in accordance with another embodiment of the present invention. Optical frame 70 includes a spherical segment 71 and a connector mount 72, and an optical passage 73 extending from connector mount 72 to spherical segment 71. Optical frame 80 includes an optical seat 81, a spherical segment 82, and an optical passage 83 extending from optical scat 81 to spherical segment 82. The tube 90 includes a frame seat 91 and a frame seat 92.

Optical frame 70 provides a mounting of optical fiber 21 on optical connector mount 31 by a conventional affixing of an optical connector 20 to optical mount 72 via adhesives or screws. Optical frame 80 provides a mounting of lens 22 to optical connector mount 31 by a conventional seating of lens 22 within optical seat 81. An adjoining of tube 90 to optical frame 70 and optical frame 80 allows and maintains an optical alignment of optical fiber 21 and lens 22 as exemplarily represented by the dashed line extending between optical fiber 21 and lens 22. Tube 90 is adjoined to optical frame 70 by a seating of spherical segment 71 within frame seat 91, and tube 90 is adjoined to optical frame 80 by a seating of spherical segment 82 within frame seat 92.

Spherical segment 71 and frame seat 91 are dimensioned for freely seating spherical segment 71 within frame seat 91 (i.e., both an axial clearance and a radial clearance exist between spherical segment 71 and frame seat 91). Likewise, spherical segment 82 and frame seat 92 are dimensioned for freely seating spherical segment 82 within frame seat 92 (i.e., both an axial clearance and a radial clearance exist between spherical segment 82 and frame seat 92). Frame seat 91 and frame seat 92 are further dimensioned to allow for a spatial clearance between optical frame 70 and optical frame 80 when tube 90 is adjoined to optical frame 70 and optical frame 80.

Ideally, there would be zero radial clearance between spherical segment 71 and frame seat 91, and spherical segment 82 and frame seat 92. In practice, those skilled in the art will appreciate the actual radial clearance between spherical segment 71 and frame seat 91, and spherical segment 82 and frame seat 92 can depend upon many factors, particularly a manufacturing tolerance associated with a fabrication of optical frame 70, optical frame 80, and tube 90. In one embodiment, for spherical segments 61 and 62 with spherical radius of 10 millimeters, the radial clearance between seats 41 and 52 and spherical segments 61 and 62, respectively, is 15+/−7 microns.

The axial clearance between optical frame 70 and tube 90, and optical frame 80 and tube 90 is determined by considering the amount of movement expected in each of the six degrees of freedom during the alignment process.

When spherical segment 71 is seated within frame seat 91 and spherical segment 82 is seated within frame seat 92, optical frame 70 has six degrees of freedom relative to lens 22, and optical frame 80 has six degrees of freedom relative to optical fiber 21 similarly to optical frame 40 and optical frame 50, respectively as illustrated in FIG. 2. Additionally, further adjustments to an optical alignment of optical fiber 21 and lens 22 can be accomplished in the aforementioned conventional manners.

Referring again to FIG. 6, one method of assembling optical connector mount 31 in accordance with the invention includes a first stage involving a conventional affixing of fiber connector 20 to connector mount 71 and a conventional seating of lens 22 in optical seat 81. A second stage involves a seating of spherical segment 71 within frame seat 91, and a seating of spherical segment 82 within frame seat 92. The second stage utilizes the seating of spherical segments 71 and 82 within frame seats 91 and 92, respectively, to allow for an optical alignment of optical fiber 21 and lens 22 during a third stage.

The third stage involves a stabilization of optical frame 80 and an adjustment of optical frame 70 relative to lens 22 via conventional tools, during which spherical segments 71 and 82 within frame seats 91 and 92, respectively. Optical frame 70 is adjusted to obtain a desired operational alignment of optical fiber 21 and lens 22 (e.g., an alignment where a focus point of the lens 22 coincides with the tip of optical fiber 21).

In one alternative embodiment, the third stage involves a stabilization of optical frame 70 and an adjustment of optical frame 80 relative to optical fiber 21 via conventional tools, during which spherical segments 71 and 82 within frame seats 91 and 92, respectively. Optical frame 80 is adjusted to obtain a desired operational alignment of optical fiber 21 and lens 22.

In a second alternative embodiment, the third stage involves both an adjustment of optical frame 70 relative to lens 22 and an adjustment of optical frame 80 relative to optical fiber 21 via conventional tools, during which spherical segments 71 and 82 remain seated within frame seats 91 and 92, respectively. Optical frames 70 and 80 are adjusted to obtain a desired operational alignment of optical fiber 21 and lens 22.

A final stage involves a locking of spherical segment 71 to frame seat 91 (e.g., by a screw or an adhesive), and a locking of spherical segment 82 to frame seat 92 (e.g., by a screw or an adhesive). The final stage uses the locking of spherical segments 71 and 82 within frame seats 91 and 92, respectively, to maintain the optical alignment of optical fiber 21 and lens 22 achieved during the third stage.

Various examples of assembling optical frame 70, tube 90 and optical frame 80 will now be described herein with reference to FIG. 6.

Figure 7:
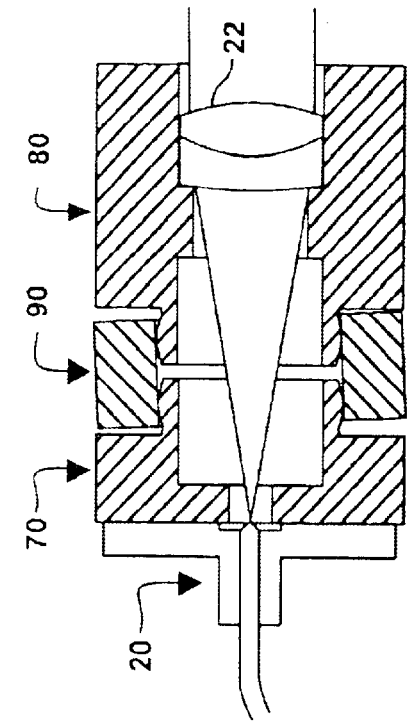
FIGS. 7–9 illustrate various exemplary assemblies of the optical connector mount illustrated in FIG. 6.

FIG. 7 illustrates a first exemplary assembly of spherical segments 71 and 82 of FIG. 6 within frame seats 91 and 92 of FIG. 6, respectively. In the FIG. 7 illustration, optical frame 70 is centered along the optical axis of lens 22 to align a focal point of lens 22 with the tip of optical fiber 21.

Figure 8:
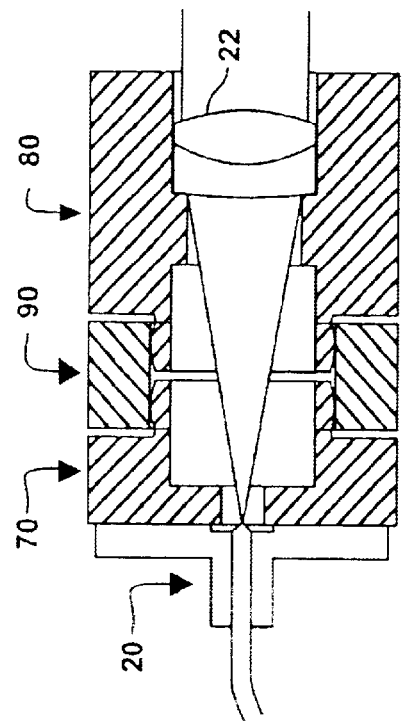

FIG. 8 illustrates a second exemplary assembly of spherical segments 71 and 82 of FIG. 6 within frame seats 91 and 92 of FIG. 6, respectively. In the FIG. 8 illustration, optical frame 70 is laterally offset relative to frame 80 to align the focal point of lens 22 with the tip of optical fiber 21.

Figure 9:
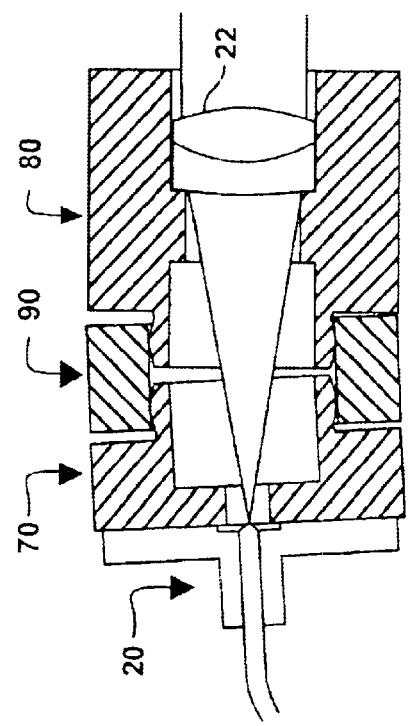

FIG. 9 illustrates a third exemplary assembly of spherical segments 71 and 82 of FIG. 6 within frame seats 91 and 92 of FIG. 6, respectively. In the FIG. 9 illustration, optical frame 70 is tilted and laterally offset relative to frame 80 to align the focal point of lens 22 with the tip of optical fiber 21.

From FIGS. 7–9, those having ordinary skill in the art will appreciate the ability to simultaneously axially offset, laterally offset, tilt, and rotate optical frame 70 relative to frame 80 when aligning the focal point of the lens 22 with the opening of the optical fiber 21. Additionally, those having ordinary skill in the art will appreciate the ability to simultaneously axially offset, laterally offset, tilt, and rotate optical frame 80 relative to frame 70 when optically aligning the focal point of lens 22 with the tip of the optical fiber 21, yet retaining the ability to lock spherical segments 71 and 82 within frame seats 91 and 92, respectively, upon achieving alignment Referring still to FIGS. 7–9, the focal point of lens 22 coinciding with an tip of optical fiber 21 represents an ideal operational alignment of the optical coupling of optical fiber 21 and lens 22 in most applications of optical connector mount 31. However, in practice, the focal point of lens 22 does not have to coincide with the tip of optical fiber 21.

Figure 10:
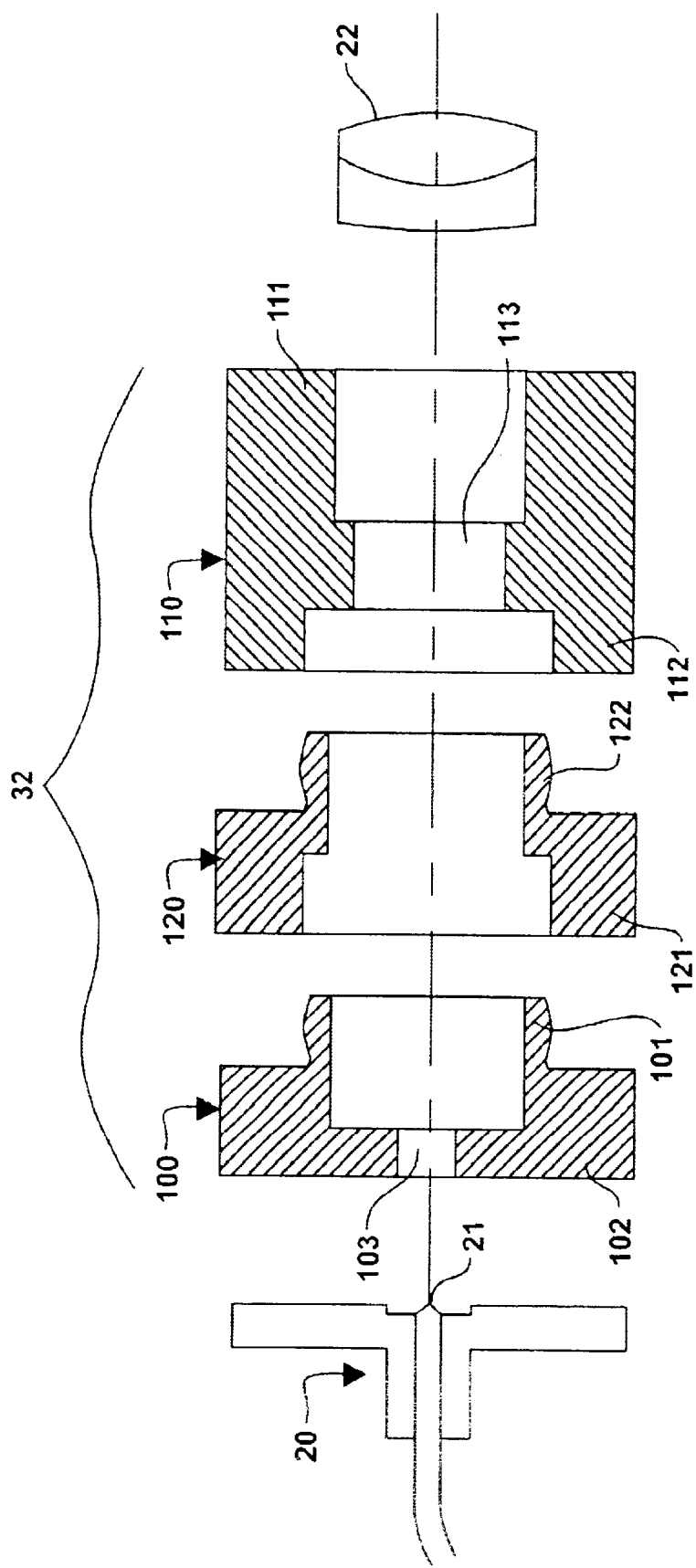
FIG. 10 illustrates a cross-sectional side view of a third embodiment of an unassembled optical connector mount constructed in accordance with the present invention.

FIG. 10 illustrates an optical frame 100, an optical frame 110, and a tube 120, which are the primary components of an optical connector mount 32 for optically coupling optical fiber 21 and lens 22 in accordance with another embodiment of the present invention. Optical frame 100 includes a spherical segment 101 and a connector mount 102, and an optical passage 103 extending from connector mount 102 to spherical segment 101. Optical frame 110 includes an optical seat 111, a tube seat 112, and an optical passage 113 extending from optical seat 111 to tube seat 112. The tube 120 includes a frame seat 121 and a spherical segment 122.

Optical frame 100 provides a mounting of optical fiber 21 on optical connector mount 32 by a conventional affixing of an optical connector 20 to optical mount 102 via adhesives or screws. Optical frame 110 provides a mounting of lens 22 to optical connector mount 32 by a conventional seating of lens 22 within optical seat 111. An adjoining of tube 120 to optical frame 100 and optical frame 110 allows and maintains an optical alignment of optical fiber 21 and lens 22 as exemplarily represented by the dashed line extending between optical fiber 21 and lens 22. Tube 120 is adjoined to optical frame 100 by a seating of spherical segment 101 within frame seat 121, and tube 120 is adjoined to optical frame 110 by a seating of spherical segment 122 within tube seat 112.

Spherical segment 101 and frame seat 121 are dimensioned for freely seating spherical segment 101 within frame seat 121 (i.e., both an axial clearance and a radial clearance exist between spherical segment 101 and frame seat 121). Likewise, spherical segment 122 and tube seat 112 are dimensioned for freely seating spherical segment 122 within tube seat 112 (i.e., both an axial clearance and a radial clearance exist between spherical segment 122 and tube seat 112). Frame seat 121 and tube seat 112 are further dimensioned to allow for a spatial clearance between optical frame 100 and optical frame 110 when tube 120 is adjoined to optical frame 100 and optical frame 110.

Ideally, there would be zero radial clearance between spherical segment 101 and frame seat 121, and spherical segment 122 and tube seat 112. In practice, those skilled in the art will appreciate the actual radial clearance between spherical segment 101 and frame seat 121, and spherical segment 122 and tube seat 112 can depend upon many factors, particularly a manufacturing tolerance associated with a fabrication of optical frame 100, optical frame 110, and tube 120. In one embodiment, for spherical segments 61 and 62 with spherical radius of 10 millimeters, the radial clearance between seats 41 and 52 and spherical segments 61 and 62, respectively, is 15+/−7 microns. The axial clearance between frame 100 and tube 120, and tube 120 and frame 110 is determined by considering the amount of movement expected in each of the six degrees of freedom during the alignment process.

When spherical segment 101 is seated within frame seat 121 and spherical segment 122 is seated within tube seat 112, optical frame 100 has six degrees of freedom relative to lens 22, and optical frame 110 has six degrees of freedom relative to optical fiber 21 similarly to optical frame 40 and optical frame 50, respectively as illustrated in FIG. 2. Additionally, further adjustments to an optical alignment of optical fiber 21 and lens 22 can be accomplished in the aforementioned conventional manners.

Referring again to FIG. 10, one method of assembling optical connector mount 32 in accordance with the invention includes a first stage involving a conventional affixing of fiber connector 20 to connector mount 101 and a conventional seating of lens 22 in optical seat 111. A second stage involves a seating of spherical segment 101 within frame seat 121, and a seating of spherical segment 122 within tube seat 112. The second stage utilizes the seating of spherical segments 101 and 122 within seats 121 and 112, respectively, to allow for an optical alignment of optical fiber 21 and lens 22 during a third stage.

The third stage involves a stabilization of optical frame 110 and an adjustment of optical frame 100 relative to lens 22 via conventional tools, during which spherical segments 101 and 122 within seats 121 and 112, respectively. Optical frame 100 is adjusted to obtain a desired operational alignment of optical fiber 21 and lens 22 (e.g., an alignment where a focus point of the lens 22 coincides a tip of optical fiber 21).

In one alternative embodiment, the third stage involves a stabilization of optical frame 100 and an adjustment of optical frame 110 relative to optical fiber 21 via conventional tools, during which spherical segments 101 and 122 remain seated within seats 121 and 112, respectively. Optical frame 110 is adjusted to obtain a desired operational alignment of optical fiber 21 and lens 22.

In a second alternative embodiment, the third stage involves both an adjustment of optical frame 100 relative to lens 22 and an adjustment of optical frame 110 relative to optical fiber 21 via conventional tools, during which spherical segments 101 and 122 remain seated within seats 121 and 112, respectively. Optical frames 100 and 110 are adjusted to obtain a desired operational alignment of optical fiber 21 and lens 22.

A final stage involves a locking of spherical segment 101 to frame seat 121 (e.g., by a screw or an adhesive), and a locking of spherical segment 122 to tube seat 112 (e.g., by a screw or an adhesive). The final stage uses the locking of spherical segments 101 and 122 within seats 121 and 112, respectively, to maintain the optical alignment of optical fiber 21 and lens 22 achieved during the third stage.

Various examples of assembling optical frame 100, tube 120 and optical frame 110 will now be described herein with reference to FIG. 10.

Figure 11:
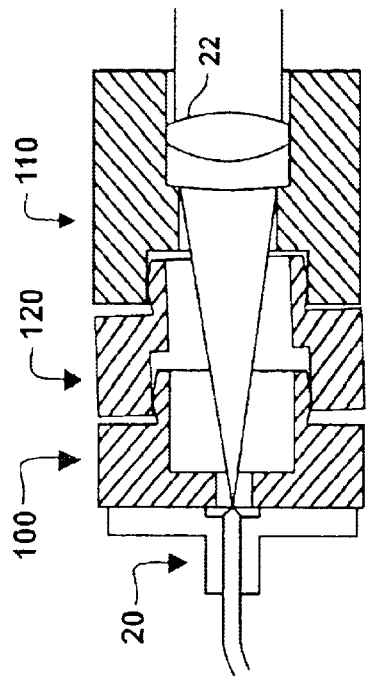
FIGS. 11–13 illustrate various exemplary assemblies of the optical connector mount illustrated in FIG. 10.

FIG. 11 illustrates a first exemplary locking of spherical segments 101 and 122 of FIG. 10 within seats 121 and 112 of FIG. 10, respectively. In the FIG. 11 illustration, optical frame 100 is centered along the optical axis of lens 22 to align a focal point of lens 22 with the tip of optical fiber 21.

Figure 12:
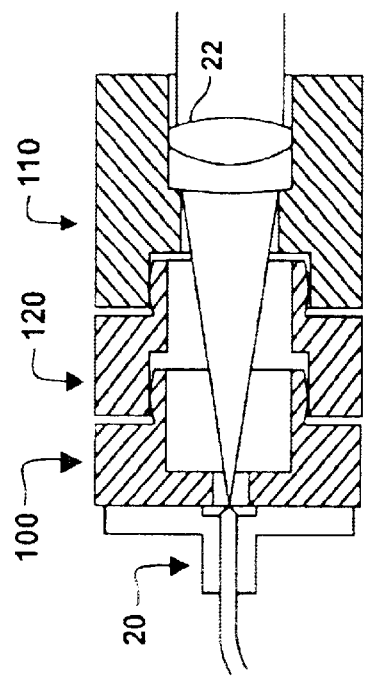

FIG. 12 illustrates a second exemplary locking of spherical segments 101 and 122 of FIG. 10 within seats 121 and 112 of FIG. 10, respectively. In the FIG. 12 illustration, optical frame 100 is laterally offset relative to frame 110 to align the focal point of lens 22 with the tip of optical fiber 21.

Figure 13:
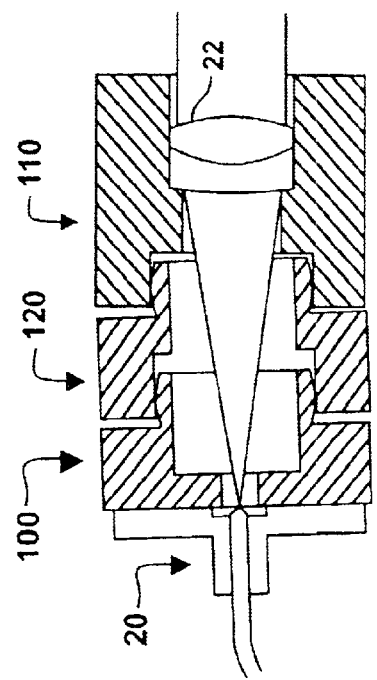

FIG. 13 illustrates a third exemplary locking of spherical segments 101 and 122 of FIG. 10 within seats 121 and 112 of FIG. 10, respectively. In the FIG. 13 illustration, optical frame 100 is tilted and laterally offset relative to frame 110 to align the focal point of lens 22 with the tip of optical fiber 21.

From FIGS. 11–13, those having ordinary skill in the art will appreciate the ability to simultaneously axially offset, laterally offset, tilt, and rotate optical frame. 100 relative to frame 110 when aligning the focal point of the lens 22 with the opening of the optical fiber 21. Additionally, those having ordinary skill in the art will appreciate the ability to simultaneously axially offset, laterally offset, tilt, and rotate optical frame 110 relative to frame 110 when optically aligning the focal point of lens 22 with the tip of the optical fiber 21, yet retaining the ability to lock spherical segments 101 and 122 within seats 121 and 112, respectively, upon achieving alignment.

Referring still to FIGS. 11–13, the focal point of lens 22 coinciding with an tip of optical fiber 21 represents an ideal operational alignment of the optical coupling of optical fiber 21 and lens 22 in most applications of optical connector mount 32. However, in practice, the focal point of lens 22 does not have to coincide with the tip of optical fiber 21.

Figure 16:
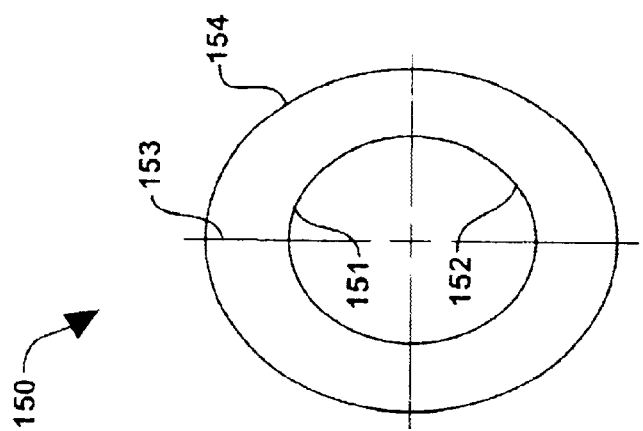
FIG. 16 illustrates a view of a third embodiment of a seat constructed in accordance with the present invention.
Figure 15:
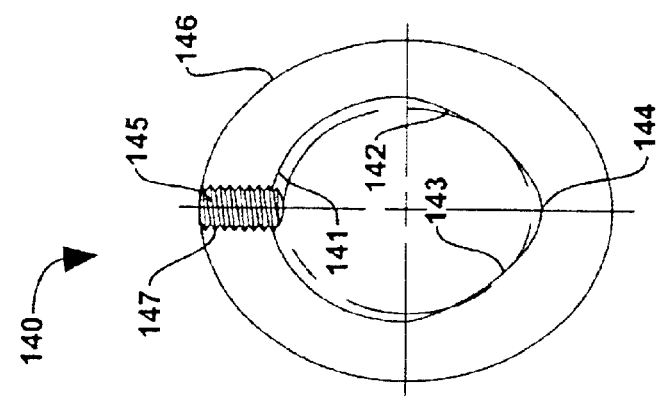
FIG. 15 illustrates a view of a second embodiment of a seat constructed in accordance with the present invention.
Figure 14:
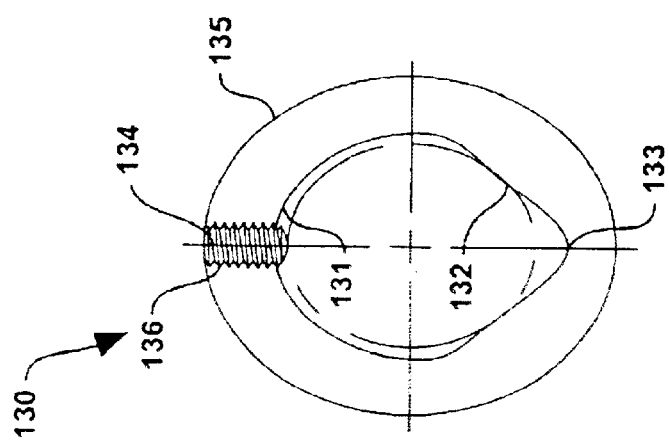
FIG. 14 illustrates a view of a first embodiment of a seat constructed in accordance with the present invention.

Each tube seat and frame seat illustrated in FIGS. 1–13 is preferably constructed to lock a desired orientation of a spherical segment within it. FIGS. 14–16 are provided herein to illustrate several embodiments of a seat constructed in accordance with the present invention.

FIG. 14 illustrates a seat 130 having an inner wall with a circular upper wall section 131 and a "V" shaped lower wall section 132 for achieving a desired orientation of a spherical segment seated within seat 130. A threaded hole 136 extends through an outer wall 135 of seat 130 to the upper wall section 131. In one embodiment, the sides of lower wall section 132 form an angle between 10° and 110°, and threaded hole 136 opposes an apex 133 of lower wall section 132. Additionally, when a spherical segment is fully seated within seat 130, threaded hole 136 is axially aligned with a widest part of the spherical segment. In practice, screw 134 is rotatably mated with threaded hole 136 whereby a torque can be applied to the screw to thereby lock the spherical segment in a desired orientation within seat 130.

FIG. 15 illustrates a seat 140 having an inner wall with a circular upper wall section 141 and two are shaped lower wall sections 142 and 143 for achieving a desired orientation of a spherical segment seated within the seat 110. Are shaped lower wall sections 142 and 143 meet at an apex 144. A threaded hole 147 extends through an outer wall 146 of seat 140 to upper wall section 141. In one embodiment, the sides of the lower wall section 142 and 143 in contact with the spherical segment form an angle between 10° and 110°, and the threaded hole 147 opposes apex 144. Additionally, when a spherical segment is fully seated within seat 140, the threaded hole 147 is axially aligned with a widest part of the spherical segment. In practice, screw 145 is rotatably mated with threaded hole 147 whereby a torque can be applied to the screw to thereby lock the spherical segment in a desired orientation within seat 140.

FIG. 16 illustrates a seat 150 having a cylindrical inner wall 151 for achieving a desired orientation of a spherical segment seated within seat 150. A cylindrical access hole 152 extends through an outer wall 153 of seat 150 to the inner wall 151. In one embodiment, when a spherical segment is fully seated within seat 150, access hole 152 is axially aligned with a widest part of the spherical segment. In practice, an adhesive (e.g., a low viscosity fast-setting adhesive) can be injected into access hole 152 to thereby lock the spherical segment in a desired orientation within seat 150.

From the preceding description of the various embodiments of optical connector mounts illustrated in FIGS. 1–16, those having ordinary skill in the art will appreciate that, in practice, the actual shape and dimensions of the optical frames and the tube of the present invention are dependent upon the size, shape, and material properties of the optical elements being mounted onto the optical connector mount. The actual shape and dimensions of the optical frames and the tube of the present invention will also be dependent upon an operational application of the optical connector mount. Those having ordinary skill in the art will further appreciate the various materials suitable in the fabrication of the optical frames and the tube of the present invention (e.g., metal, ceramic, plastic). Ideally, the optical frames and the tube of the present invention are fabricated from the same material.

The number of embodiments of an optical connector mount constructed in accordance with the present invention is without limit. Furthermore, the various types of optical elements (e.g., an optical fiber, a lens, a mirror, etc.) and the number of optical elements mounted within an optical connector mount constructed in accordance with the present invention are without limit. The similarity of the mounted optical elements (e.g., two optical fibers) and the diversity of the mounted optical elements (e.g., an optical fiber and a lens) are also without limit.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. An optical connector mount for optically coupling a first optical element and a second optical element, said optical connector mount comprising:

a first optical frame for mounting the first optical element on said optical connector mount, said first optical frame including a first tube seat;

a second optical frame for mounting the second optical element on said optical connector mount, said second optical frame including a second tube seat; and a tube adjoined to said first optical frame and said second optical frame for allowing and maintaining an optical alignment of the first optical element and the second optical element, said tube including a first spherical segment seated and locked within said first tube seat to thereby adjoin said tube to said first optical frame, and a second spherical segment seated and locked within said second tube seat to thereby adjoin said tube to said second optical frame.

2. The optical connector mount of claim 1, wherein said first tube seat includes means for locking said first spherical segment within said first tube scat.

3. The optical connector mount of claim 2, wherein said second tube seat includes means for locking said second spherical segment within said second tube seat.

4. An optical connector mount for optically coupling a first optical element and a second optical element, said optical connector mount comprising:

a first optical frame for mounting the first optical element on said optical connector mount, said first optical frame including a tube seat;

a second optical frame for mounting the second optical element on said optical connector mount, said second optical frame including a first spherical segment; and a tube adjoined to said first optical frame and said second optical frame for allowing and maintaining an optical alignment of the first optical element and the second optical element, said tube including a second spherical segment seated and locked within said tube seat to thereby adjoin said tube to said first optical frame, and a frame seat, wherein said first spherical segment is seated and locked within said frame seat to thereby adjoin said tube to said second optical frame.

5. The optical connector mount of claim 4, wherein said tube seat includes a means for locking said second spherical segment within said tube seal.

6. The optical connector mount of claim 4, wherein said frame seat includes means for locking said first spherical segment within said frame seat.

7. An optical connector mount for optically coupling a first optical element and a second optical element, said optical connector mount comprising:

a first optical frame for mounting the first optical element on said optical connector mount, said first optical frame including a first optical spherical segment;

a second optical frame for mounting the second optical element on said optical connector mount, said second optical frame including a second spherical segment; and a tube adjoined to said first optical frame and said second optical frame for allowing and maintaining an optical alignment of the first optical element and the second optical element, said tube including a first frame seat, wherein said first spherical segment is sealed and locked within said first frame seat to thereby adjoin said tube to said first optical frame, and a second frame seat, wherein said second spherical segment is scated and locked within said second frame seat to thereby adjoin said tube to said second optical frame.

8. The optical connector mount of claim 7, wherein said first frame seat includes means for locking said first spherical segment within said first frame seat.

9. The optical connector mount of claim 8, wherein said second frame seat includes means for locking said second spherical segment within said second frame seat.

* * * * *